US010841382B2

(12) United States Patent
Somaraju

(10) Patent No.: US 10,841,382 B2
(45) Date of Patent: Nov. 17, 2020

(54) BUILDING TECHNOLOGY DEVICE COMMUNICATION SYSTEM WITH IOT-NETWORK DEVICES

(71) Applicant: TRIDONIC GMBH & CO KG, Dornbirn (AT)

(72) Inventor: Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 104 days.

(21) Appl. No.: 16/079,626

(22) PCT Filed: Jan. 31, 2017

(86) PCT No.: PCT/EP2017/051963
§ 371 (c)(1),
(2) Date: Aug. 24, 2018

(87) PCT Pub. No.: WO2017/153093
PCT Pub. Date: Sep. 14, 2017

(65) Prior Publication Data
US 2020/0084277 A1    Mar. 12, 2020

(30) Foreign Application Priority Data

Mar. 11, 2016  (EP) ................................. 16159819
Jun. 13, 2016  (GB) ................................. 1610685.8

(51) Int. Cl.
*H04L 12/00* (2006.01)
*H04L 29/08* (2006.01)
(Continued)

(52) U.S. Cl.
CPC .......... *H04L 67/12* (2013.01); *H04L 12/2807* (2013.01); *H04L 12/2834* (2013.01);
(Continued)

(58) Field of Classification Search
CPC . H04L 12/2854; H04L 41/08; H04L 41/0823; H04L 41/084; H04L 41/085;
(Continued)

(56) References Cited

U.S. PATENT DOCUMENTS 8,341,291 B2 * 12/2012 Twitchell, Jr. .......... H04L 69/28
709/238
9,584,482 B2 * 2/2017 Burns ..................... H04L 12/66
(Continued)

FOREIGN PATENT DOCUMENTS

EP     2897442     7/2015
EP     2922321     9/2015
(Continued)

OTHER PUBLICATIONS

Great Britain Search Report dated Feb. 13, 2017 in priority GB Application 1610685.8.
(Continued)

*Primary Examiner* — Frantz Coby
(74) *Attorney, Agent, or Firm* — Andrus Intellectual Property Law

(57) ABSTRACT

A building technology device communication system is provided, comprising at least one border router comprising a first network interface configured to connect to an external network, and a second network interface configured to connect to an IoT-network, and wherein the border router is configured to logically and/or physically connect the external network to the IoT-network, preferably in a wireless mesh network, and a plurality of IoT-network devices in the IoT-network connected directly and/or indirectly to the at least one boarder router by wired and/or wireless connection, wherein the plurality of IoT-network devices is adapted to selectively operate in an ad-hoc communication mode.

13 Claims, 4 Drawing Sheets

(51) Int. Cl.
  *H04W 4/70* (2018.01)
  *H04L 12/28* (2006.01)
  *H04L 12/715* (2013.01)
  *H04L 29/12* (2006.01)
  *H04W 12/06* (2009.01)
  *H04W 84/18* (2009.01)
  *H04W 88/16* (2009.01)

(52) U.S. Cl.
  CPC .......... *H04L 45/04* (2013.01); *H04L 61/6081* (2013.01); *H04W 4/70* (2018.02); *H04W 12/06* (2013.01); *H04W 84/18* (2013.01); *H04W 88/16* (2013.01)

(58) Field of Classification Search
  CPC ... H04L 41/0806; H04L 67/14; H04L 67/141; H04L 45/00; H04N 21/238; H04N 21/64707
  USPC ....... 709/222, 220, 218, 227, 228, 238, 249, 709/250
  See application file for complete search history.

(56) References Cited

U.S. PATENT DOCUMENTS

| | | | | |
|---|---|---|---|---|
| 9,716,675 | B2* | 7/2017 | Choi | H04L 51/02 |
| 9,774,497 | B2* | 9/2017 | Britt | H04W 4/70 |
| 9,853,826 | B2* | 12/2017 | Shuman | H04L 67/16 |
| 2013/0159548 | A1* | 6/2013 | Vasseur | H04L 45/125 |
| | | | | 709/239 |
| 2014/0244836 | A1* | 8/2014 | Goel | H04W 4/70 |
| | | | | 709/224 |
| 2015/0195136 | A1* | 7/2015 | Mermoud | H04L 41/5025 |
| | | | | 706/12 |
| 2015/0312089 | A1 | 10/2015 | Lucent | |
| 2016/0041534 | A1* | 2/2016 | Gupta | H04W 4/70 |
| | | | | 700/275 |
| 2016/0128043 | A1* | 5/2016 | Shuman | H04W 72/044 |
| | | | | 370/331 |
| 2016/0135241 | A1* | 5/2016 | Gujral | H04L 67/12 |
| | | | | 370/328 |
| 2016/0323689 | A1* | 11/2016 | Goluboff | H04L 63/0823 |
| 2016/0381030 | A1* | 12/2016 | Chillappa | H04W 4/70 |
| | | | | 726/11 |

FOREIGN PATENT DOCUMENTS

| | | |
|---|---|---|
| WO | 2011119019 | 9/2011 |
| WO | 2015200558 | 12/2015 |

OTHER PUBLICATIONS

PCT Search Report dated Jun. 7, 2017 in parent PCT Application PCT/EP2017/051963.

Rao et al., Implementing LWM2M in constrained IoT devices, 2015 IEEE Conference on Wireless Sensors, Aug. 24, 2015, pp. 52-57.

* cited by examiner

BUILDING TECHNOLOGY DEVICE COMMUNICATION SYSTEM WITH IOT-NETWORK DEVICES

CROSS REFERENCE TO RELATED APPLICATIONS

The present application is the U.S. national stage application of International Application PCT/EP2017/051963 filed Jan. 31, 2017, which international application was published on Sep. 14, 2017 as International Publication WO 2017/153093 A1. The International Application claims priority to European Patent Application 16159819.8 filed Mar. 11, 2016; and Great Britain Patent Application 1610685.8 filed Jun. 13, 2016.

FIELD OF THE INVENTION

The invention relates to a building technology device communication system and a border router of such building technology device communication system. In the building technology device communication system, the border router connects an external network and an IoT-network in which a plurality of IoT-network devices are connected. The IoT-network devices in particular are luminaires, lighting devices, sensors and/or actuators.

BACKGROUND OF THE INVENTION

A schematic overview of the general setup is shown in FIG. 1, wherein a border router links an external network to an IoT-network. The IoT-network comprises a plurality of IoT-network devices, three of which are exemplarily shown on the IoT-network side of the border router. The external network can comprise multiple network devices, such as mobile communication devices. The external network preferably is a LAN, WAN or the Internet, and can employ multiple link techniques (wired and/or wireless) as well as a variety of network protocols such as IPv4, IPv6, IPX and others (cf. e.g. https://en.wikipedia.org/wiki/Lists_of_network_protocols).

It is known that in small IoT-networks, especially in home and end-consumer environments, a person who installs IoT-network devices typically also commissions the IoT-network devices. In this scenario, only a small number of IoT-network devices are added to the network. The commissioner obtains an identifier information from each IoT-network device, e.g. by reading textual or encoded information (e.g. a barcode or a QR-code) from each IoT-network device, preferably using a scanning device or smartphone with an barcode-scanner application, and provides this identification information to a specific device on the IoT-network, especially a border router, which, in turn, communicates with the other IoT-network devices to allow them to join the network using the respective identifier information.

The invention addresses commissioning of a plurality of IoT-network devices in industry grade IoT-networks where a large number of IoT-network devices, e.g. in the range of 5 to 300 up to 1000 or more, need to be integrated into an IoT-network. In this application scenario, manual commissioning by obtaining identifier information from each IoT-network device individually is impractical and would take a long time during commissioning. Also, since in large installations staff responsible for installation of the IoT-network devices often is different from staff performing the commissioning, additional organization overhead would be generated.

SUMMARY OF THE INVENTION

The invention provides a solution, which allows an automated or nearly automated configuration and commissioning of the IoT-network devices. Basis of the invention is found in the Thread specification as published on http://threadgroup.org/RESOURCES/White-Papers, and in particular in the white paper "Thread Stack Fundamentals". Thread is primarily aimed at home user environments. The invention therefore, while based on the foundations of Thread, extends Thread to be usable and applicable for large scale installations of IoT-network devices ad especially building technology devices.

The invention therefore provides a building technology device communication system and a border router as described.

In a first aspect a building technology device communication system is provided, comprising at least one border router comprising a first network interface configured to connect to an external network, and a second network interface configured to connect to an IoT-network, and wherein the border router is configured to logically and/or physically connect the external network to the IoT-network, preferably in a wireless mesh network, and a plurality of IoT-network devices in the IoT-network connected directly and/or indirectly to the at least one boarder router by wired and/or wireless connection, wherein the plurality of IoT-network devices is adapted to selectively operate in an ad-hoc communication mode.

At least one IoT-network device of the plurality of IoT-network devices can comprise identifier information data. The at least one IoT-network device can, directly or indirectly, send the identifier information data to the border router, preferably in intervals or at a specific point in time and/or by a communication action of a beacon, which preferably is a message broadcast by already commissioned devices to uncomissioned devices.

At least one IoT-network device of the plurality of IoT-network devices can send identifier information data to at least one second IoT-network device of the plurality of IoT-network devices, preferably a neighbor IoT-network device and preferably according to a connection quality indicator. The at least one second IoT-network device of the plurality of IoT-network devices can, directly or indirectly, send received identifier information data of the at least one IoT-network device to the border router. At least one IoT-network device can forward information received, preferably identifier information data, of another network device to at least one second IoT-network device. The at least one second IoT-network device can be the border router.

The building technology device communication system further can comprise a remote server and/or a cloud system. The remote server and/or the cloud system can receive identifier information data. The remote server and/or a cloud system may associate received identifier information data with corresponding authorization data stored at the server and/or in the cloud system.

The border router may receive identifier information data and can collect and/or store the received identifier information data, especially identifier information data received directly or indirectly from and/or via neighboring IoT-network devices. The border router can sort and/or group the collected identifier information data according to a specific parameter, in particular based on signal strength and/or a response time. The border router can send the sorted and/or grouped identifier information data to the remote server and/or cloud system. The border router can send the collected and/or stored identifier information data to the remote server and/or the cloud system.

The building technology device communication system can further comprise a commissioning device, preferably a mobile communication device. The commissioning device can execute a commissioning application, the commissioning application being preferably configured to communicate, especially by wireless communication, with the remote server and/or cloud system. The commission device may obtain the received, collected, sorted and/or grouped identifier information data from the border router and/or can receive identifier information data of neighbor devices from the at least one IoT-network device, especially the border router.

The remote server and/or the cloud system can send the authorization data to the border router, the commissioning device and/or the commissioning application, preferably in association with the received identifier information data.

The border router, the commissioning device and/or the commissioning application can commission the plurality of IoT-network devices using the collected identifier information data and/or the authorization data received from the remote server and/or cloud system.

The plurality of IoT-network devices in the IoT-network can be grouped into at least two subnets. At least two IoT-network devices of the entire plurality of IoT-devices of all different subnets can be grouped in at least one control group comprising at least two IoT-network devices, for example one per subnet.

The border router can be connected to at least one subnet and comprises at least one configurable network interface. The configurable network interface can evaluate, receive and/or forward only data packages addressed to the at least one subnet the border router is connected to and/or addressed to a control group a member of which is located in the at least one subnet.

The at least one IoT-network device can be a member of at least one subnet and can comprise at least one configurable network interface configured to evaluate, receive and/or forward only data packages addressed to the at least one subnet the at least one IoT-network device is member of, and/or addressed to the at least one IoT-network device and/or addressed to to a control group the at least one IoT-network device is member of.

The at least one configurable network interface of the border router and/or of the at least one IoT-network device can be statically configured. The data packages can be multicast packages.

The IoT-network can be a wireless mesh network, preferably an IPv6-based addressable network, and preferably uses 6LoWPAN and/or an IEEE 802.15.4 based protocol. The external network can be an IEEE 802.15.4, Ethernet, wireless and/or IP based network. The border router can be configured to send out network data on the IoT-network indicating to an IoT-network device in receipt of the network data that operation in the ad-hoc mode should be started.

The plurality of IoT-network devices can be building technology devices, in particular sensors and/or actuators such as lighting means and/or luminaires.

In another aspect, a border router for a wireless mesh network in a building technology device communication system is provided, wherein the border router comprises a first network interface configured for an external network, and a second network interface configured for an IoT-network, and wherein the border router is configured to logically and/or physically connect the external network to the IoT-network, wherein the border router is a LWM2M client device and is preferably configured to enable an application management information exchange.

BRIEF DESCRIPTION OF THE DRAWINGS

The invention is now also described with reference to the figures. In particular.

DETAILED DESCRIPTION

To facilitate commissioning of an IoT-network and/or IoT-network devices in the building technology device communication system, the IoT-network and/or the IoT-network devices can especially be put into an ad-hoc mode selectively.

The building technology device communication system preferably employs a wireless mesh protocol that facilitates a reliable, low-power, wireless device-to-device communication. It is designed for systems where IP-based networking and a variety of application layers can be used on the used network stack.

Figure 1:
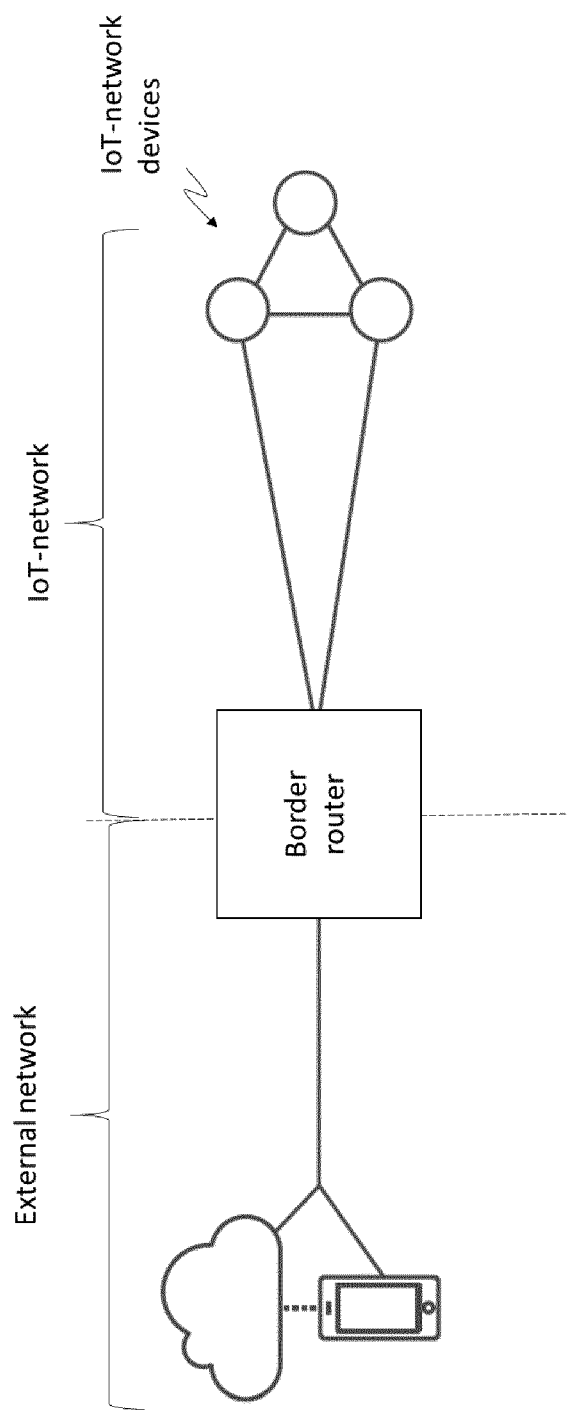
FIG. 1 shows a schematic overview of a general network setup.
Figure 2:
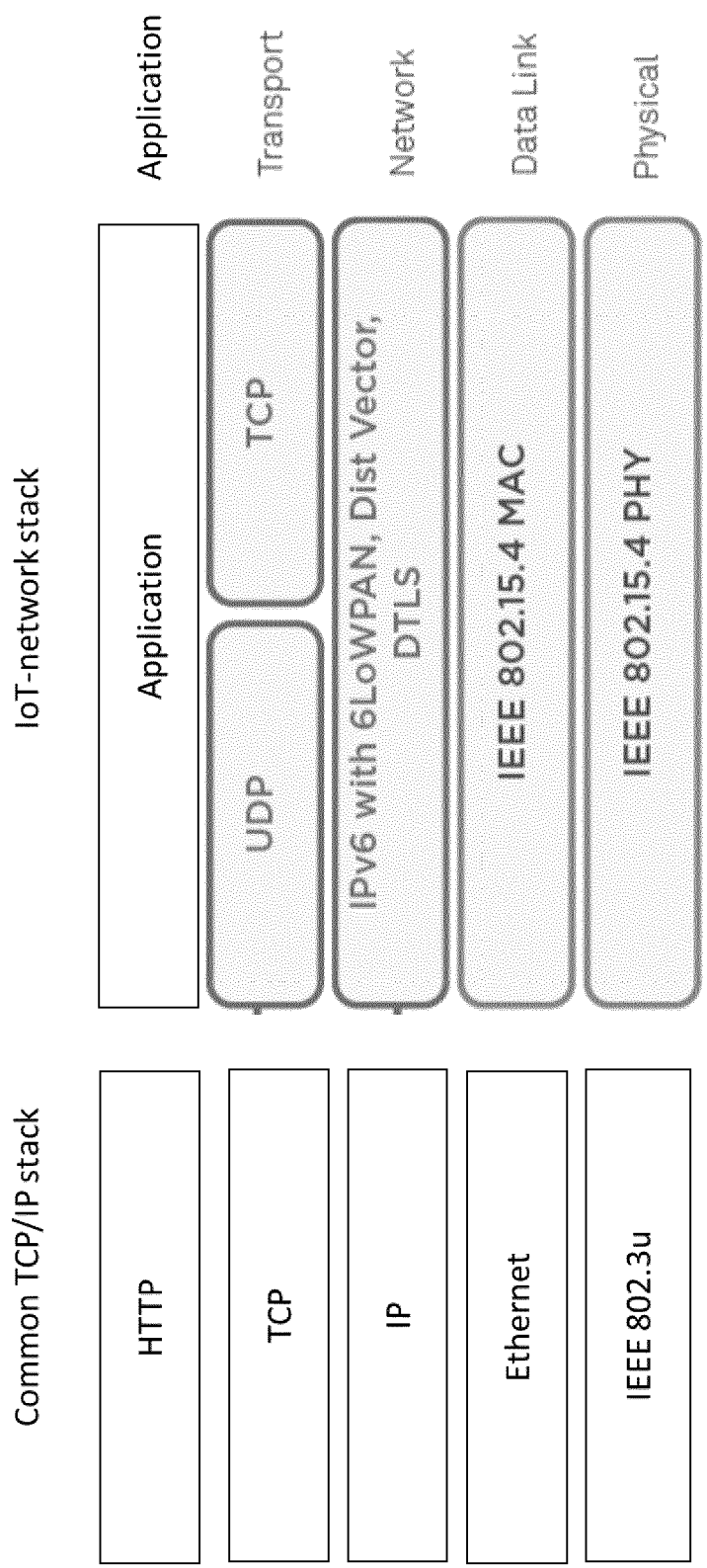
FIG. 2 shows a protocol used in the Building technology device communication system.

The network stack used in the building technology device communication system is exemplarily displayed in FIG. 2 vis-à-vis the common TCP/IP stack. The stack, as also detailed in "Thread Stack Fundamentals" is based on the IEEE 802.15.4 physical (PHY) and media access control (MAC) layers operating at approximately 250 kbps in the 2.4 GHz band. The IEEE 802.15.4-2006 version of the specification preferably is used.

The 802.15.4 MAC layer is used for basic message handling and congestion control. The MAC layer also includes a carrier sense multiple access (CSMA) mechanism for devices to listen for a clear channel as well as a link layer to handle retries and acknowledgement of messages for reliable communication between adjacent devices. A MAC layer encryption and integrity protection can also be used on messages based on established keys and configuration can be achieved by the higher layers of the network stack. The network layer builds on the underlying mechanisms to provide reliable entry and communication. In particular, IEEE 802.15.4-2006 specification is a standard for wireless communication that defines the wireless MAC and physical (PHY) layers. It is designed for low power applications. One of the characteristics derived from the need for low power and limiting the bit error rate is enforcing network packages sized to be sent over the air.

Figure 3:
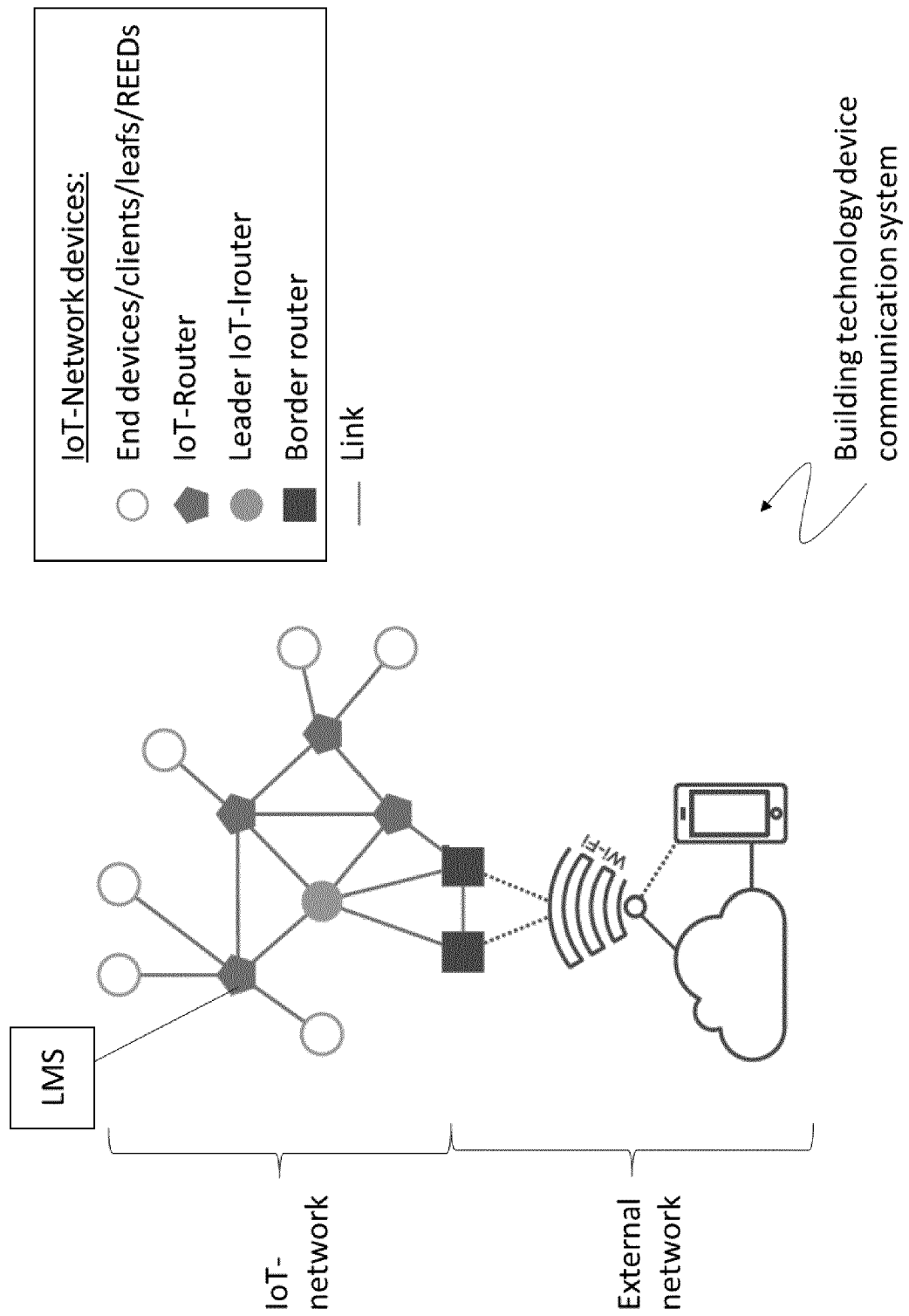
FIG. 3 shows the Building technology device communication system.

As shown in FIG. 3, illustrating the IoT-network side in more detail, specific network devices of the IoT-network are configured as IoT-routers or border routers, which can also assume a so called "leader" role for certain functions in the IoT-network. The leader function is used to make decisions within the IoT-network. For example, IoT-network devices assigned with the leader function can assign router addresses and/or allow routing requests. The "leader" role is elected between the IoT-network devices configured as IoT-router and/or border router and if the leader fails, another IoT-network device configured as IoT-router and/or border router assumes the leader role. This facilitates autonomous operation and also ensures a reliable operation.

In the following, a border router is a specific IoT-network device or a specific type of router that provides connectivity from the IoT-network (IEEE 802.15.4 based network) to the at least one external network, which can be based on another physical or data-link layer (for example WiFi and/or Ethernet). Border routers provide services for devices within the IoT-network, including routing services. There may be one or more border router in the IoT-network.

IoT-network devices can also be IoT-routers that provide routing services to IoT-network devices within the IoT-network. IoT-routers also provide joining or security services for IoT-network devices trying to join the IoT-network. Moreover, IoT-routers and border routers are not designed to go into a sleep mode. IoT-routers can downgrade their functionality to become so called router-eligible end devices (REEDs), which are IoT-network devices, which can provide IoT-router functionality, but do not currently provide it due to the IoT-network topology or IoT-network conditions. REEDs do not generally forward messages or provide joining or security services to other IoT-network devices in the IoT-network. The REEDs can become router if necessary, preferably without user interaction.

Also, IoT-network devices can go into sleep mode in which they only communicate with a parent IoT-router and may especially not forward messages to other network devices.

Addressing in the IoT-network supports IPv6 addressing as specified in IETF RFC 4291. Each IoT-network device can configure one or more unique local address (ULA) and/or global unicastaddress (GUA).

In IoT-network device that starts building the IoT-network, especially a border router, chooses a 64 bit prefix, which is then used throughout the IoT-network. The prefix is preferably a locally assigned global identifier, also known as ULA prefix according to IETF RFC 4193, and can be referred to as the mesh local ULA prefix. The IoT-network may also have one or more border routers that each may or may not have a prefix that can then be used to generate additional GUAs. An IoT-network device in the IoT-network can use a hardware address, such as a MAC address, to derive a unique identifier. For example, the MAC address typically comprises 48 bits. However, it can be turned into a 64 bit address (EUI-64 address) by inserting additional 16 bits. The extended MAC address can be derived as defined in section 6 of IETF RFC 4944. From this address, a local link IPv6 address is generated, preferably with a local prefix (FI80::00/64) as described in IETF RFC 4862 and IETF RFC 4944.

The IoT-network devices can also support appropriate multicast addresses. This can include link-local all node multicast, link-local all router multicast and realm local multicast.

Each IoT-network device joining the IoT-network is assigned a 16 bit short address as defined in the IEEE 802.15.4 specification. For IoT-routers, this address is assigned using the high bits in the address field with the lower bits set to 0, indicting an IoT-router address. IoT-network devices connected to IoT-routers are then allocated as a 16 bit short address using their parent IoT-routers' high bits at the appropriate lower bits for their addresses. The IoT-routers serve as parents for the IoT-network devices that are neither IoT-routers nor border routers, also called clients, leafs, hosts, or end-devices. This allows any other device in the IoT-network to understand a routing location of an IoT-network device simply by using the high bits of its address field.

As shown in FIG. 2, the IoT-network stack used by the invention uses 6LoWPAN which stands for "IPv6 over Low power Wireless Personal Area Networks". Further specifics of 6LoWPAN are defined in "Thread Usage of 6LoWPAN" (http://threadgroup.org/Portals/0/documents/whitep apers/Thread%20Usage%20of%206LoWPAN%20white%20paper_v 2_public.pdf). The main goal of 6LoWPAN is to transmit and receive IPv6 packages over IEEE 802.15.4 links. Therefore, it has to accommodate for the IEEE 802.15.4 maximum frame size sent over the air. For example in Ethernet links, a network package with the size of the IPv6 maximum transmission unit (1280 bites) can be easily sent as one frame over the link. In the case of IEEE 802.15.4, 6LoWPAN acts as an adaptation layer between the IPv6 networking layer and the IEEE 802.15.4 link layer. This solves the issue of transmitting an IPv6 maximum transmission unit by fragmenting the IPv6 network package at the sender and reassembling it at the receiver. 6LoWPAN also provides a compression mechanism that produces the IPv6 network package header size sent over the air and thus reduces transmission overhead. The fewer bits sent over the air, the less energy is consumed by the network device. The use of 6LoWPAN is defined in IETF RFC 4944 and RFC 6282, which describe in detail the methods by which fragmentation and header compression are accomplished.

In particular, all IoT-network devices of the IoT-network use 6LoWPAN as defined in IETF RFC 4944. Header compression is used within the IoT-network and IoT-network devices transmitting messages compressed the IPV6 header as much as possible to minimize the size of transmitted network packages.

A mesh header is supported for more efficient compression of messages within the IoT-network and for link layer forwarding. The mesh header also allows an end-to-end-fragmentation of messages rather than a hop-by-hop fragmentation as specified in an IETF RFC 4944. The IoT-network uses route-over configuration, which gives network devices IP-level visibility into the underlying connectivity.

Preferably, DHCPv6 is used to assign short addresses to IoT-routers, border routers and/or IoT-network devices. Therefore, neighbor discovery as specified in IETF RFC 6757 is not strictly necessary. IoT-network devices are typically allocated addresses from their parent IoT-router and these addresses are derived from the parent router as described above. With 6LoWPAN the short addresses are then used to generate the necessary ULAs required.

Further, all network devices support the internet control message protocol version 6 (ICMPv6) as defined in IETF RFC 4443 and ICMPV6 error messages, as well as the eco request and eco reply messages. The IoT-network stack also supports the user datagram protocol (UDP) as defined in IETF RFC 768 for messaging between the network devices.

The IIoT-network stack supports full mesh connectivity between all IoT-routers/border routers in the IoT-network. The actual topology of the IoT-network is based on the number of IoT-routers/border routers in the IoT-network. If there is only one IoT-router or border router, then a basic start topology with a single IoT-router is formed. If there is more than one IoT-router or border router, then a mesh topology is automatically formed.

FIG. 3 illustrates a basic topology of the IoT-network and the types of IoT-network devices. The mesh network makes the connectivity between the IoT-network devices more reliable by allowing to forward messages between the connected IoT-network devices of the mesh network. For example, if an IoT-network device cannot send a message directly to another IoT-network device, the mesh network forwards the messages through one or more intermediate IoT-network devices.

IoT routers/border routers of the IoT-network maintain routes and connectivity with each other so the mesh is constantly maintained and connected. There is typically a limit of 32 active routers in the IoT-network. However, 64 IoT-router addresses are used to allow recycling of the IoT-router addresses. Therefore, while a limit of 64 IoT-router addresses exists in the IoT-network, not all of these addresses can be used at once. However, addresses of deleted or removed IoT-network devices can be used.

In the mesh network, the router eligible end devices or network devices in sleep mode do not route data for other devices. The IoT-network hence typically has up to 32 active IoT-routers that use the next-hop routing for messages based on the network device routing tables. The device routing tables are maintained by the IoT-network stack to ensure all IoT-routers have connectivity and up-to-date routing information for any other IoT-router in the IoT-network. The routing information protocol algorithm is used, which is basically outlined in IETF RFC 1058 and IETF RFC 2080. However, specific message formats defined therein are not necessarily used.

All IoT-routers exchange with other IoT-routers their costs of routing information in a compressed format using mesh link establishment (MLE). Hosts are either REEDs or IoT-network devices in sleep mode. The MLE messages are used for establishing and configuring secure radio links, detecting neighboring devices and maintaining routing between devices in the IoT-network. MLE messages are transported using single-hop-local unicast and multicast between the IoT-routers. MLE messages are used for identifying, configuring and securing links to neighboring devices as the topology environment changes. MLE messages are also used to distribute configuration values that are shared across the IoT-network, such as the channel and personal area network identifier data. The messages can be forwarded with simple flooding as specified by the multicast protocol low power and networks. MLE messages also ensure estimated link costs are considered when establishing a routing course between two network devices. Asymmetric link costs are common in 802.15.4 networks. To ensure that two way messaging is reliable it is important to consider the cost of directional link. The IoT-network can use on-demand route discovery, which is costly in terms of network overhead and bandwidth due to route discovery requests flooding the network.

In the IoT-network of the invention, all IoT-routers periodically exchange a single-hop-MLE advertisement packages containing link cost information to all neighbor IoT-routers, and pass link cost information to all other routers in the IoT-network. Through these periodic local updates, all IoT-routers have up-to-date cost information to any other IoT-router in the IoT-network, so on-demand route discovery is not required. If a route is no longer used, IoT-routers can make a selection on the next most suitable route to the destination route to a destination. This self-healing approach allows IoT-routers to quickly detect when another IoT-router does not function properly or is disconnected from the IoT-network. It also allows to calculate best path to maintain connectivity to all other IoT-network devices on the IoT-network.

The link quality in each direction is based on the link cost on incoming messages from the neighboring IoT-network devices. Routing to child network devices or hosts is done by looking at the high bits of a child's address to determine the current router address. Once the IoT-network device knows the parent IoT-router, it knows the path costs information and next-hop routing information for that network device. The link cost is measure of received signal strength indicator of received messages above the received level.

The path costs of any other IoT-network device in the IoT-network is the minimum sum of link costs to each IoT-network device. IoT-routers monitor these costs, even as a radio link quality or topology of the IoT-network changes, and propagate the new costs through the IoT-network using the periodic MLE advertisement messages. Routing cost is based on bi-directional link quality between two network devices.

Internally, each IoT-router stores next-hop information that is not sent in the advertisement. The first few advertisements would have part costs equal to link costs, because the only routers that are known are immediate neighbors. As IoT-routers start hearing advertisements from the neighbors that contain costs other than routers that are two or more hops away, there are routing tables populated with multi-hop part costs, which then propagate even further until eventually there is connectivity information between all IoT-routers in the IoT-network. When a router receives a new MLE advertisement from a neighbor, either it already has that neighbor in a table for IoT-network devices or the neighbor is added from the MLE advertisement, which contains the incoming cost from the neighbor so this is updated in the routers neighbor table. The MLE advertisement also contains updated routing information from the other routers and this information is updated in the device routing table. Routing information for the other IoT-routers and this information is updated in the device routing table.

For routing beyond the IoT-network, a border router notifies the leader of the particular prefix(es) it serves and this information is distributed as IoT-network data within the MLE packets. Distance vector routing is used to get routes to IoT-router addresses that are on IoT-network. IoT-network devices use IP routing to forward network packages. A leader is designated to make decisions on selecting REEDs to become IoT-routers or allowing routers to downgrade to REEDs. The leader router also assigns and manages the IoT-router addresses. However, all information contained in leader router is present in the other IoT-routers and if the routing leader becomes unreachable or unavailable, another IoT-router is autonomously selected and takes over leadership without user intervention.

While UTP messaging is used in the IoT-network, reliable message delivery is still a requirement. This is achieved by using a series of lightweight mechanisms.

In known IoT-networks such as Thread, joining of IoT-network devices is user initiated. Once joined, an IoT-network device is fully participating in the IoT-network and can exchange data layer and application layer information. Commissioning is performed with commissioning information directly available on the IoT-network device. The commissioning information allows the joining device to attach to the proper IoT-network as soon as it is introduced into the IoT-network. The commissioning session can be established between a joining IoT-network device and a commissioning application of a commissioning device, e.g. Smartphone or Tablet, and/or on/via a Web-interface. A commissioning session securely delivers commissioning information to the joining IoT-network device allowing it to attach to the proper IoT-network after having completed the commissioning session.

However, as it is the case with the system addressed by the invention, in case there is a high number of IoT-network devices, a manual commissioning cannot be performed. Therefore, the border router and the IoT-network devices need to be able to properly rate and limit their request from the network devices so that the commissioner and the border router are able to maintain multiple secure sessions simultaneously between the commissioning device and the IoT-network devices. If known approaches would be used after a first set of IoT-network devices is commissioned, the commissioner needs to pick the next batch of IoT-network devices, which are within radio range of the other IoT-network devices that have already been commissioned and needs to commission the new batch.

The new IoT-network devices have not been paired yet and therefore cannot communicate with the IoT-network. Therefore, it is very difficult to find the devices that are within radio range of the IoT-network devices that have already been commissioned. This process also needs to be repeated for all IoT-network devices and every border router which renders this approach impractical.

Moreover, in a large building with a plurality of IoT-network devices which are, in fact, building technology devices such as luminaries or lighting means, sensors and/or actuators (e.g. motion detectors, humidity detectors, smoke detectors, light detectors, motors, control units, switches, dimmers, central units, . . . ), the IoT-network devices in the building technology device communication system are configured into subnets. These subnets present challenges for addressability, portable device support, managing multicast between subnets and/or border router coordination. For example, if a group message needs to be forwarded from an IP based network to an IoT-network device on the IoT-network or from an IoT-network device connected to a different border router, forwarding rules need to be set carefully.

Another issue with multi-subnet IoT-networks is that until a network manager comes on site, the network devices are unable to acquire IoT-network addresses that have a scope valid outside the link-local zone. This implies that it is difficult to specify an address that a light management system (LMS) and a network device can use for unicast communication, for example, for lightweight machine-to-machine (LWM2M) registration and bootstrapping. LWM2M is a protocol from the Open Mobile Alliance for machine-to-machine or IoT-device management.

The invention therefore provides the building technology device communication system for commissioning a lighting system using a commission device connected directly or indirectly to a border router. This connection can be either wired or wireless.

According to the invention an IoT-network device to be commissioned can send out identifier information data by wired or wireless communication. It can send the identifier information data to a router in intervals or at specific points in time or it can be transmitted to the router by communication with a beacon present in or at the IoT-network device. Also, the IoT-network device does not have to be directly connected to the border router but can also be connected via other IoT-network devices to the border router. The building technology devices, i.e. the IoT-network devices, of the IoT-network can be used to forward identifier information data of other IoT-network devices to the border router.

The border router, in the end, can collect all the identifier information data and is also capable of sorting the identifier information data into a specific order. This ordering can, for example, be based on signal strength (RSSI), response time and/or other parameters. The identifier information data are then either sent directly to a remote server, e.g. a cloud system, or are sent to or obtained by a commissioning device, which preferably is a mobile communication device running a commissioning application, which can communicate, especially by wireless communication, with the remote server/cloud system.

This means that the identification information data can be directly sent to the commissioning device and/or the commissioning application via the border router. In particular, the border router preferably is not the final destination of the identification information data. This also means, that the commissioning application can, by using hardware resources of the commissioning device, such as a communication module, obtain the identification information data, preferably by wireless communication with the border router and/or the remote server/cloud system.

The remote server, the commissioning application, the commissioning device and/or cloud system then identifies the identifier information data submitted with corresponding authorization data and sends the authorization data to the border router, the mobile communication device and/or the commissioning application, in case the identifier information data submitted with corresponding authorization data are identified on the remote server or in the cloud system. The transmission of the identifier information data and/or authorization data can be secured by different security implementations, for example by SSL. The border router, the commissioning device and/or the commissioning application can use the authorization data for commissioning the IoT-network devices identified by the device identifier information data.

For the management of large installations of IoT-network devices, different IoT-network devices can be organized in IoT-network subnets, which together include all the devices that should be addressed and controlled in the IoT-network, which is part of the building technology device communication system.

To allow IoT-network devices in different subnets to be reachable by common requests the border routers and IoT-network devices of the IoT-network have configurable network interfaces. For example, an IoT-network device, including the border routers, can be configured to receive and/or forward only specific multicast messages to subnets it is connected to. One specific advantage of this implementation is that multicast messages that should be forwarded are preferably statically defined in the border router as well as in the IoT-network devices. Therefore, it is clear which messages are accepted at the border router, forwarded at the border router but also accepted and/or forwarded at the IoT-network devices. A multicast message sent in the IoT-network therefore reaches the different IoT-network devices in different subnets, as the multicast message is forwarded to and only accepted by the respective IoT-network devices. By the configuration of the router and/or the IoT-network devices, i.e. the configurable interfaces, control groups for this type of common control are defined. This also allows to avoid any of the multicast advertising messages present in IPv6 networks, which cause a lot of network traffic and message passing. So in principle the multicast structure is statically defined after the commissioning of the devices by one time configuration of the interfaces.

Further the grouping of devices inside an organization and the communication of devices inside the organization with other organizations, preferably by the external network. In particular, the solution presented allows to either assign a globally accessible IP address to each device but alternatively or additionally also a local address, preferably an IPv6 address that allows communication with the IoT-network devices. The devices are especially grouped by the address assignment. Therefore, if e.g. a group of IoT-network devices should be addressed, a control information can be forwarded to a range of local addresses.

In particular, the border router satisfies the requirements of an LWM2M client to enable the exchange of application management messages with another border router. Further, the IoT-network can be put into an ad-hoc-mode, preferably by setting a router-hardware fingerprint type length value (TLV), or, for example, when the IoT-network devices, which include the border routers, IoT-routers, REEDs and clients, are not commissioned (which can be indicated by a commissioning flag) or if there are no links configured or available.

Figure 4:
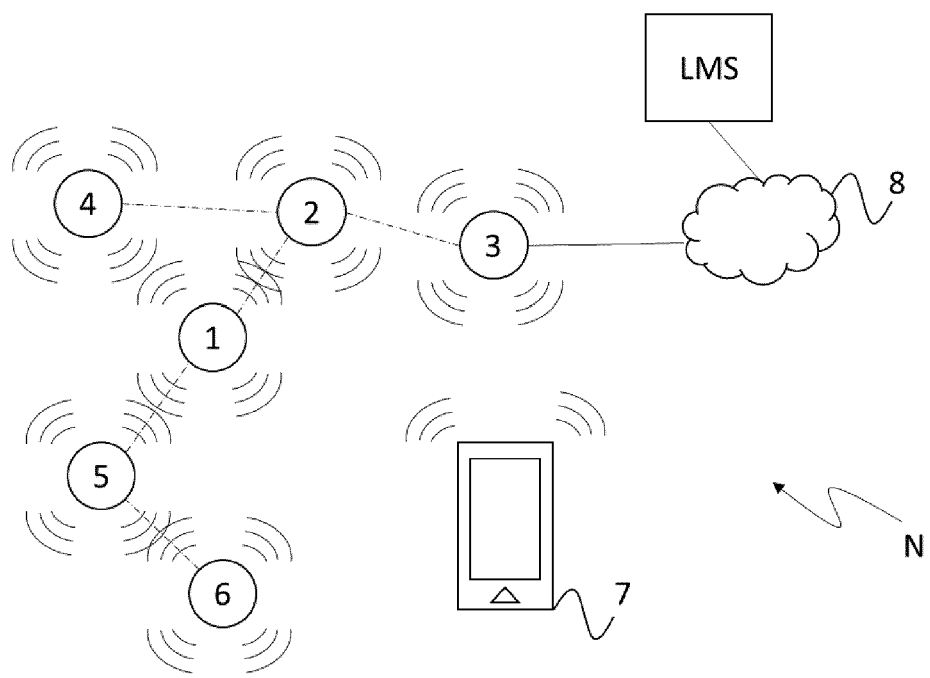
FIG. 4 shows a more detailed aspects of the invention.

FIG. 4, shows a more detailed example. When the IoT-network N is set into the ad-hoc communication mode, which can be indicated by IoT-network data transmitted on the IoT-network N, then an IoT-network device 1 is able to register with its identifier information data, preferably EUI-64 identification data, with a link local neighbor 2. Preferably, an IoT-network device is in ad-hoc mode, after it is powered-up. Now, a commissioning device 7 is able to query any commissioned IoT-network device 1-6 to get a list of the identifier information data (e.g. the EUI-64 addresses) of its link local neighbor, preferably with an indication of the RSSI of the neighbor. For example, the IoT-network device 2 can be an IoT-router, while the IoT-network device 3 can be a border router.

Therefore, an IoT-network device 1-6, and especially IoT-network device 3 (e.g. the border router) can progressively collect and add identifier information data received by other IoT-network devices 1, 2, 4-6, which are added to the IoT-network N. When IoT-network device 3 is then queried, e.g. by the commissioning device 7, commissioning information of IoT-network device 3, i.e. the identifier information data, e.g. RSSIs of other IoT-network devices, collected at IoT-network device 3, can be read by the commissioning device, which then includes identifier information data from further away IoT-network devices. Eventually, all IoT-network devices are added at the IoT-network device 3 and can thus be queried. In this example, the border router receives identifier information data received directly or indirectly from and/or via neighboring IoT-network devices 1, 2, 4-6. The neighboring IoT-network devices 1, 2, 4-6 are not necessarily direct neighbors, but since intermediate IoT-network devices, e.g. IoT-network devices 5, 1 and 2, relay the identifier information data for other IoT-network devices, e.g. for IoT-network device 6, eventually, the border router (IoT-network device 3) receives identifier information data of all other IoT-network devices over time.

Further, the commissioning application and/or the commissioning device 7 is configured to get authorization data, e.g. passwords, matching the identifier information data for every IoT-network device in the IoT-network N. Also, a beacon communication action or a NFC-tag can be used to enter authorization data. A cloud look up to a remote server or a cloud system 8 can be used to look up authorization data, e.g. the passwords, associated with the identifier information data. These authorization data can be stored at manufacturing time.

The border router 3 is commissioned to be the initial leader of the IoT-network N. Further, the commissioning application or the commissioning device 7 can set the border router 3 to an ad-hoc operation mode. The border router 3 can get a list of the identifier information data, preferably EUI-64 addresses, of its link local neighbors (in this case IoT-network device 2). The border router 3 maintains a list of identifier information data of link local neighbors of already commissioned IoT-network devices and a Received Signal Strength Indicator (RSSI). The border router 3 updates the identifier information data/neighbor list every time an IoT-network device has been commissioned onto the IoT-network N according to data transmitted to the border router 3. The commissioning device 7 can also sequentially use a filter, for example a bloom filter, to allow devices to join based on the RSSI in the link-local neighbor list of already commissioned IoT-network devices.

Immediately after the IoT-network 1 device has been commissioned, the commissioning device 7, the border router 3 and/or the commissioning application provides an IPv6 ULA of a light management system (LMS) to the IoT-network N device 1 to enable a LWM2M bootstrap and registration. After all IoT-network devices have been added to the IoT-network N, the IoT-network N is configured to change from the ad-hoc communication mode to a commissioned mode. This, for example, can be facilitated by the IoT-/border router 2, 3 elected as leader sending out specific configuration data to the IoT-network devices 1-6 to put them into commission mode.

The border router 3 also acquires a ULA prefix from an uplink router. If the uplink router is not available or unable to provide an ULA, the border router 3 randomly generates a ULA prefix for the IoT-network N or for a subnet of the IoT-network N. The border router 3 provides this ULA prefix to all IoT-network 1, 2, 4-6 devices that request an ULA prefix. Every IoT-network device 1, 2, 4-6 requests a ULA prefix from a site-local unique address by using its identifier information data.

During the LWM2M registration process, an IoT-network device 1-6, including the border router 3, uses the ULA to register with the LMS. The network settings included in the commissioning data set (for example channel, mesh-local prefix, personal area network (PAN) ID and master key (for each IoT-network subnet) is part of the IOT network) can be changed by the commissioning application or commissioning device 7. An IoT-network device 1, 2, 4-6 can be removed from the IoT-network N, and can be reconnected to an IoT-network or IoT-network subnet connected to a different border router while maintaining connectivity.

In case more than one IoT-network subnet is defined for the IoT-network N, a configurable interface of a border router or IoT-network device can be used by an IoT-network device 1-6 to register its interest for receiving traffic destined to a specific IPv6 multicast address or address range. The border router 3 can configure a filter policy at the border router 3 to allow only certain IPv6 multicast packages onto the IoT-network N. This configuration can be driven through the commissioning device 7 and/or the commissioning application. When an IoT-network device 1-6 has been added to a control group (or application group) and a multicast address for this control group is received, the IoT-network device 1-6 uses the configurable interface to add the multicast forwarding address to the border router filter. The border router 3 forwards multicast network packages originating in the IoT-network having a multicast scope higher than a realm-local multicast scope onto its backbone network interface by default.

For MPL (Multicast Protocol for Low power and Lossy Networks, IETF RFC 7731) network packages originating outside the IoT-network, IP-in-IP encapsulation preferably is not used. Every REED can provide a configurable filtering to allow only certain IPv6 multicast traffic to be forwarded and to discard other multicast network packages. Of course, this holds for all IoT-network devices. The configurable network interface of the network devices can be used by the light management system to optimize multicast traffic or group communication.

The IoT-network devices 1-6, can persistently store commissioning information and data about links and neighbors. But they can also provide volatile buffer memory to store data. The IoT-network devices 1-6 can also comprise beacon devices which can be used to transmit data between each other.

The invention claimed is:

1. A building technology device communication system, comprising
    at least one border router (3) comprising a first network interface configured to connect to an external network, and a second network interface configured to connect to an IoT-mesh network (N), and wherein the border router is configured to logically and/or physically connect the external network to the IoT-network (N); and
    a plurality of IoT-network devices (1-6) in the IoT-network (N) connected directly and/or indirectly to the at least one boarder router (3) by wired and/or wireless connection, said plurality of IoT network devices comprising end devices and IoT routers, and comprising sensors, actuators and luminaires; wherein
    the plurality of IoT-network devices (1-6) is adapted to communicate via the Thread protocol;
    wherein all the IoT routers in the IoT network periodically exchange single hop advertisement packages containing link cost information to all neighbor IoT routers, and pass link cost information to all other routers in the IoT network, such that all IoT routers have up-to-date link cost information to any other router in the IoT network, said link cost being a measure of the received signal strength indicator of the respective received advertisement package above the received level, and said single hop advertisement packages containing the link cost information being transmitted in a compressed format using mesh link establishment (MLE).

2. The building technology device communication system according to claim 1, wherein at least one IoT-network device (1) of the plurality of IoT-network devices (1-6) comprises identifier information data, and wherein the at least one IoT-network device (1) is configured to directly or indirectly send the identifier information data to the border router (3) in intervals or at a specific point in time by a communication action of a beacon.

3. The building technology device communication system according to claim 1, wherein the at least one IoT-network device (1) of the plurality of IoT-network devices (1-6) is configured to send an identifier information data to at least one second IoT-network device (2) of the plurality of IoT-network devices, and wherein the at least one second IoT-network device (2) of the plurality of IoT-network devices (1, 2, 4, 5, 6) directly or indirectly sends received identifier information data of the at least one IoT-network device (1) to the border router (3), and the at least one IoT-network device (1) is configured to forward information received of another network device (6) to at least one second IoT-network device (2), and wherein the at least one second IoT-network device (2) is the border router (3).

4. A building technology device communication system according claim 1, wherein the building technology device communication system further comprises a remote server, wherein the remote server is configured to receive identifier information data, and
    wherein the remote server is configured to associate the received identifier information data with corresponding authorization data stored at the server.

5. A building technology device communication system for commissioning a lighting system, comprising:
    at least one border router (3) comprising a first network interface configured to connect to an external network via a remote server or cloud system, and a second network interface configured to connect to an IoT-network (N) communicating via the Thread protocol, and wherein the border router is configured to logically and/or physically connect the external network to the IoT-network (N);
    a plurality of IoT-network devices (1-6) in the IoT-network (N) connected directly and/or indirectly to the at least one boarder router (3) by wired and/or wireless connection; wherein the plurality of IoT-network devices (1-6) is adapted to selectively operate in an ad-hoc communication mode, and said plurality of IoT network devices comprising sensors, actuators and luminaires; and
    a commissioning device (7) which is a mobile communication device configured to execute a commissioning application, the commissioning application being configured to communicate by wireless communication, with the border router and/or the remote server or cloud system (8);
    wherein the IoT-network is set in the ad-hoc communication mode to enable the commissioning device to query any commissioned IoT network device for a list of identifier information data of its link local neighbor and a received signal strength of the neighbor, and the border router (3) is configured to receive identifier information data from the other commissioned IoT devices and to maintain an updated list of identifier information data of link local neighbors of already commissioned IoT devices and the received signal strength indicator (RSSI);
    wherein the border router (3) is configured to send the sorted, collected, and stored identifier information data to the commissioning device and/or the remote server or cloud system (8); and
    wherein the commissioning device (7) is configured to obtain identifier information data from the border router (3), and is further configured to allow IoT devices to join based on the RSSI in the link local neighbor list of already commissioned IoT network devices; and
    wherein after all IoT devices have been joined or commissioned to the IoT network, the IoT network is configured to change from ad hoc communication mode to a commissioned mode.

6. The building technology device communication system according to claim 5, wherein a remote server or the cloud system (8) is configured to send the authorization data to the border router (3), and a commissioning device (7) or commissioning application in association with the received identifier information data.

7. The building technology device communication system according to claim 5, wherein the border router (3), a commissioning device (7) or a commissioning application is configured to commission the plurality of IoT-network devices (1-6) using collected identifier information data or authorization data received from a remote server or a cloud system (8).

8. A building technology device communication system, comprising at least one border router (3) comprising a first network interface configured to connect to an external network, and a second network interface configured to connect to an IoT-network (N), and wherein the border router is configured to logically and/or physically connect the external network to the IoT-network (N); and a plurality of IoT-network devices (1-6) in the IoT-network (N) connected directly and/or indirectly to the at least one boarder router (3) by wired and/or wireless connection; wherein the plurality of IoT-network devices (1-6) is adapted to selectively operate in an ad-hoc communication mode;

and wherein the plurality of IoT-network devices (1-6) in the IoT-network (N) are grouped into at least two subnets, and wherein at least two IoT-network devices of the plurality of IoT-devices (1-6) of different subnets are grouped in at least one control group comprising at least two IoT-network devices.

9. The building technology device communication system according to claim 8, wherein the border router (3) is connected to at least one subnet and comprises at least one configurable network interface, the configurable network interface being configured to evaluate, receive and forward only data packages addressed to the at least one specified subnet the border router (3) is connected to.

10. The building technology device communication system according to claim 8, wherein the at least one IoT-network device (1) is member of at least one subnet and comprises at least one configurable network interface configured to evaluate, receive and forward only data packages addressed to the subnet in which the at least one IoT-network device (1) is member of, addressed to the at least one IoT-network device (1) or addressed to a control group the at least one IoT-network device (1) is member of.

11. A building technology device communication system according to claim 10, wherein the at least one configurable network interface of the border router (3) or one of the at least one IoT-network device (1) is statically configured, and the data packages are multicast packages.

12. A building technology device communication system according to claim 1, wherein the IoT-network (3) is a wireless mesh network;

wherein the border router (3) is configured to send out network data on the IoT-network indicating to an IoT-network device in receipt of the network data that operation in the ad-hoc mode should be started.

13. A building technology device communication system according claim 1, wherein the building technology device communication system further comprises a cloud system, wherein the cloud system is configured to receive identifier information data, and wherein the cloud system is configured to associate the received identifier information data with corresponding authorization data stored at the server.

* * * * *